(12) United States Patent
Yang

(10) Patent No.: US 11,451,706 B2
(45) Date of Patent: Sep. 20, 2022

(54) PHOTOGRAPHING METHOD AND MOBILE TERMINAL

(71) Applicant: VIVO MOBILE COMMUNICATION CO., LTD., Guangdong (CN)

(72) Inventor: Qihao Yang, Chang'an Dongguan (CN)

(73) Assignee: VIVO MOBILE COMMUNICATION CO., LTD., Chang'an Dongguan (CN)

( * ) Notice: Subject to any disclaimer, the term of this patent is extended or adjusted under 35 U.S.C. 154(b) by 40 days.

(21) Appl. No.: 16/980,803

(22) PCT Filed: Mar. 15, 2019

(86) PCT No.: PCT/CN2019/078241
§ 371 (c)(1),
(2) Date: Sep. 14, 2020

(87) PCT Pub. No.: WO2019/174628
PCT Pub. Date: Sep. 19, 2019

(65) Prior Publication Data
US 2021/0014413 A1   Jan. 14, 2021

(30) Foreign Application Priority Data

Mar. 15, 2018  (CN) .......................... 201810213500.1

(51) Int. Cl.
*H04N 5/232* (2006.01)
*G06T 3/40* (2006.01)

(52) U.S. Cl.
CPC ... *H04N 5/23229* (2013.01); *H04N 5/232933* (2018.08); *G06T 3/40* (2013.01)

(58) Field of Classification Search
CPC ......... H04N 5/23229; H04N 5/232933; H04N 5/23216; H04N 5/23222; H04N 5/23293;
(Continued)

(56) References Cited

U.S. PATENT DOCUMENTS

| 9,681,044 B2 * | 6/2017 | Homma | H04N 5/23296 |
| 2013/0155308 A1 * | 6/2013 | Wu | H04N 5/23219 348/333.05 |

(Continued)

FOREIGN PATENT DOCUMENTS

| CN | 101656817 A | 2/2010 |
| CN | 103297699 A | 9/2013 |

(Continued)

OTHER PUBLICATIONS

Extended European Search Report issued in corresponding application No. 19767329.6, dated Feb. 24, 2021.
(Continued)

*Primary Examiner* — Hung H Lam
(74) *Attorney, Agent, or Firm* — Maschoff Brennan

(57) ABSTRACT

A photographing method and a mobile terminal are provided. The photographing method includes: in a state where a first preview interface displays a first preview image collected by a camera, receiving a first input, inputted by a user, of selecting a target region on the first preview interface; in response to the first input, superimposing and displaying a second preview interface on the first preview interface, the second preview interface displaying a second preview image of the target region; receiving a second input inputted by the user; in response to the second input, performing a photographing operation and outputting a target image, wherein the target image is a composite image generated based on image contents displayed on the first preview interface and the second preview interface.

20 Claims, 7 Drawing Sheets

(58) Field of Classification Search
CPC ......... H04N 5/232935; H04N 5/23296; H04N 5/265; G06T 3/40; G06T 11/60; G06F 1/1686; G06F 3/04842; G06F 3/04845; G06F 3/0488

See application file for complete search history.

(56) References Cited

U.S. PATENT DOCUMENTS

| | | | |
|---|---|---|---|
| 2014/0267869 | A1 | 9/2014 | Sawa |
| 2015/0109507 | A1 | 6/2015 | Li et al. |
| 2016/0337593 | A1* | 11/2016 | Guo .................. H04N 5/23216 |
| 2017/0070670 | A1* | 3/2017 | Kwon .............. H04N 5/232935 |
| 2021/0014413 | A1 | 1/2021 | Yang |

FOREIGN PATENT DOCUMENTS

| | | |
|---|---|---|
| CN | 103777865 A | 5/2014 |
| CN | 104168422 A | 11/2014 |
| CN | 104333689 A | 2/2015 |
| CN | 104333701 A | 2/2015 |
| CN | 104423946 A | 3/2015 |
| CN | 106027910 A | 10/2016 |
| CN | 106303051 A | 1/2017 |
| CN | 106454081 A | 2/2017 |
| CN | 106502693 A | 3/2017 |
| CN | 106506935 A | 3/2017 |
| CN | 106909274 A | 6/2017 |
| CN | 3 190 496 A1 | 7/2017 |
| CN | 106993131 A | 7/2017 |
| CN | 107577409 A | 1/2018 |
| CN | 107682622 A | 2/2018 |
| CN | 108174109 A | 6/2018 |
| CN | 108495029 A | 9/2018 |
| EP | 3 125 524 A1 | 2/2017 |
| EP | 3 240 282 A2 | 11/2017 |
| EP | 3 291 533 A1 | 3/2018 |
| JP | 2010-263269 A | 11/2010 |
| WO | 2017/016030 A1 | 2/2017 |
| WO | 2017/071471 A1 | 5/2017 |

OTHER PUBLICATIONS

Chinese First Office Action issued in corresponding application No. 201810213500.1, dated Aug. 14, 2019.
Chinese Second Office Action issued in corresponding application No. 201810213500.1, dated Oct. 21, 2019.
Chinese Search Report issued in corresponding application No. 201810213500.1, dated Nov. 19, 2018.
International Search Report and Written Opinion issued in corresponding application No. PCT/CN2019/078241, dated Sep. 24, 2020.

* cited by examiner

PHOTOGRAPHING METHOD AND MOBILE TERMINAL

CROSS-REFERENCE TO RELATED APPLICATION

This application is a U.S. national phase application of PCT Application No. PCT/CN2019/078241 filed on Mar. 15, 2019, which claims a priority to Chinese Patent Application No. 201810213500.1 filed in China on Mar. 15, 2018, the disclosures of which are incorporated in their entirety by reference herein.

TECHNICAL FIELD

The present disclosure relates to the field of communications technology, in particular, relates to a photographing method and a mobile terminal.

BACKGROUND

Nowadays, with development of smart mobile terminal devices, cameras have become the most important part of a mobile phone. Continuously improving photographing experience of a user has become an important way to enhance a brand value of mobile phones.

As for photographing modes in related arts, the photographing modes of mobile phones of various manufacturers are extremely similar, and photography by a mobile phone is mostly limited to plane photography. If a photo with clear hierarchy and good composition is to be taken, users need to have high photographing skills, causing that if an image having multiple hierarchies needs to be obtained, only post-processing needs to be employed.

To sum up, in the related art, there is a problem that images with multiple hierarchies cannot be captured during a photographing process.

SUMMARY

The embodiments of the present disclosure provide a photographing method and a mobile terminal, so as to solve the problem in the related art that an image with multiple hierarchies cannot be photographed during a photographing process.

In order to solve the above technical problem, the embodiments of the present disclosure are implemented as follow:

In a first aspect, the embodiments of the present disclosure provide a photographing method. The method includes: in a state where a first preview interface displays a first preview image collected by a camera, receiving a first input, inputted by a user, of selecting a target region on the first preview interface; in response to the first input, superimposing and displaying a second preview interface on the first preview interface, the second preview interface displaying a second preview image of the target region; receiving a second input inputted by the user; in response to the second input, performing a photographing operation and outputting a target image, wherein the target image is a composite image generated based on image contents displayed on the first preview interface and the second preview interface.

In a second aspect, the embodiments of the present disclosure provide a mobile terminal. The mobile terminal includes a first reception module, used for: in a state where a first preview interface displays a first preview image collected by a camera, receiving a first input of selecting a target region on the first preview interface, the first input being inputted by a user; a first response module, used for: in response to the first input, superimposing and displaying a second preview interface on the first preview interface, the second preview interface displaying a second preview image of the target region; a second reception module, used for receiving a second input of the user; a second response module, used for: in response to the second input, performing a photographing operation and outputting a target image, wherein the target image is a composite image generated based on image contents displayed on the first preview interface and the second preview interface.

In a third aspect, the embodiments of the present disclosure provide a mobile terminal. The mobile terminal includes a processor, a storage, and a computer program stored on the storage and executable by the processor. When the computer program is executed by the processor, the processor implements the steps of the photographing method.

In a fourth aspect, the embodiments of the present disclosure provide a computer readable storage medium having a computer program stored on the computer readable storage medium, and when the computer program is executed by a processor, the steps of the photographing method are implemented.

In the embodiments of the present disclosure, in a state of displaying the first preview image collected by the camera on the first preview interface, the first input, inputted by the user, of selecting the target region on the first preview interface is received, and then in response to the first input, the second preview interface is superimposed and displayed on the first preview interface, and then in response to receiving the second input of the user, a photographing operation is performed to output the target image, wherein the target image is the composite image generated based on the image contents displayed on the first preview interface and the second preview interface, so that the target image obtained through photography includes the composite image generated by the image contents displayed on the first preview interface and the second preview interface, that is, image contents of two hierarchies of the first preview interface and the second preview interface can be obtained in a photo. An image having multiple hierarchies may be captured during the photographing process.

DETAILED DESCRIPTION

Technical solutions in the embodiments of the present disclosure will be described clearly and completely with reference to the accompanying drawings in the embodiments of the present disclosure. Obviously, the described embodiments are part, rather than all, of the embodiments of the present disclosure. Based on the embodiments in the present disclosure, all other embodiments obtained by those of ordinary skill in the art without paying creative work fall within the protection scope of the present disclosure.

Figure 1:
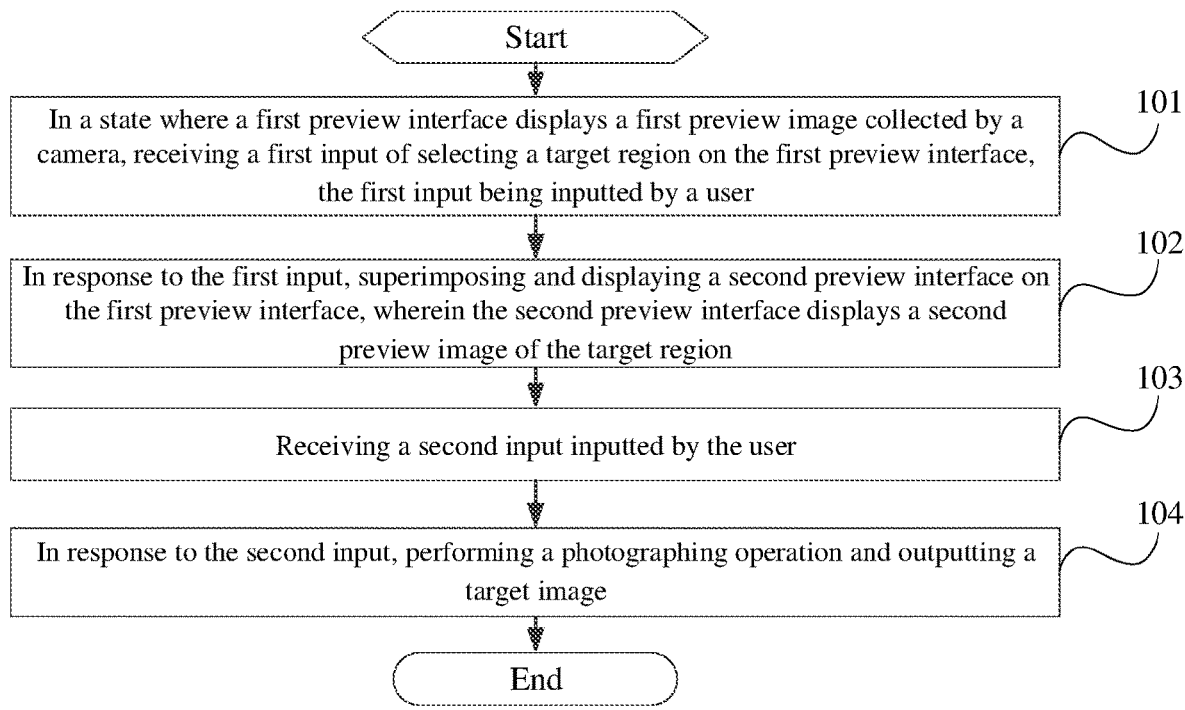
FIG. 1 shows a flowchart of steps of a photographing method in an embodiment of the present disclosure.

As shown in FIG. 1, FIG. 1 is a flowchart of steps of a photographing method in an embodiment of the present disclosure. The method includes following steps:

Step 101: in a state where a first preview interface displays a first preview image collected by a camera, receiving a first input of selecting a target region on the first preview interface, the first input being inputted by a user.

In this step, specifically, the first preview image collected by the camera is an image collected in real time by the camera and displayed on the first preview interface. In addition, the first input includes a preset graphic trajectory or an outline trajectory of an image contour inputted by the user on the first preview interface, wherein a region included in the preset graphic trajectory is a target region. Specifically, the preset graphic trajectory may be a rectangular trajectory, a circular trajectory, or other graphic trajectory. Of course, the region included in the outline trace of the image contour is also the target region.

In this way, by receiving the first input, inputted by the user, of selecting the target region on the first preview interface, the mobile terminal can respond to the first input.

Figure 2:
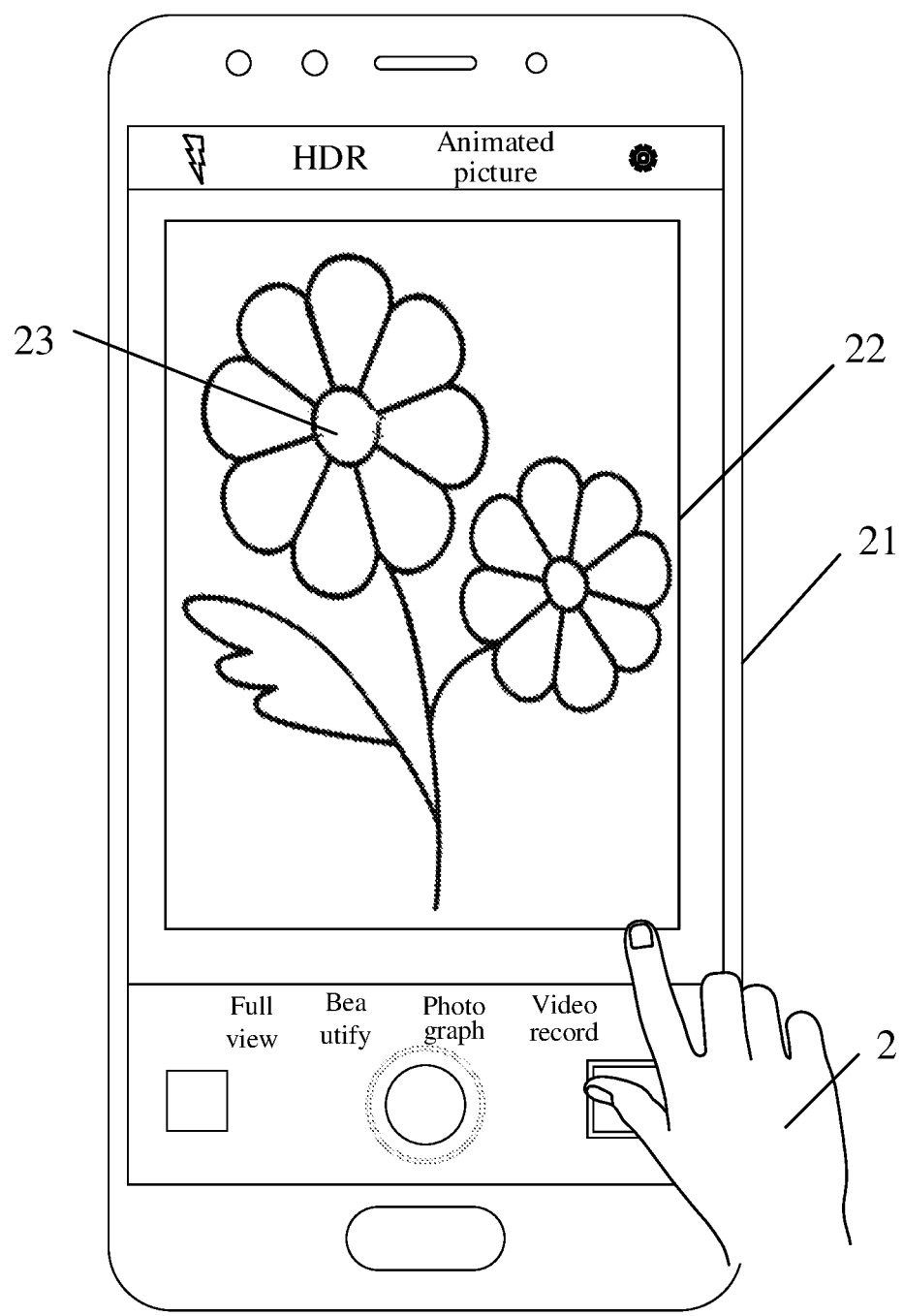
FIG. 2 shows a schematic diagram when a first input is a rectangular image trajectory in an embodiment of the present disclosure.
Figure 3:
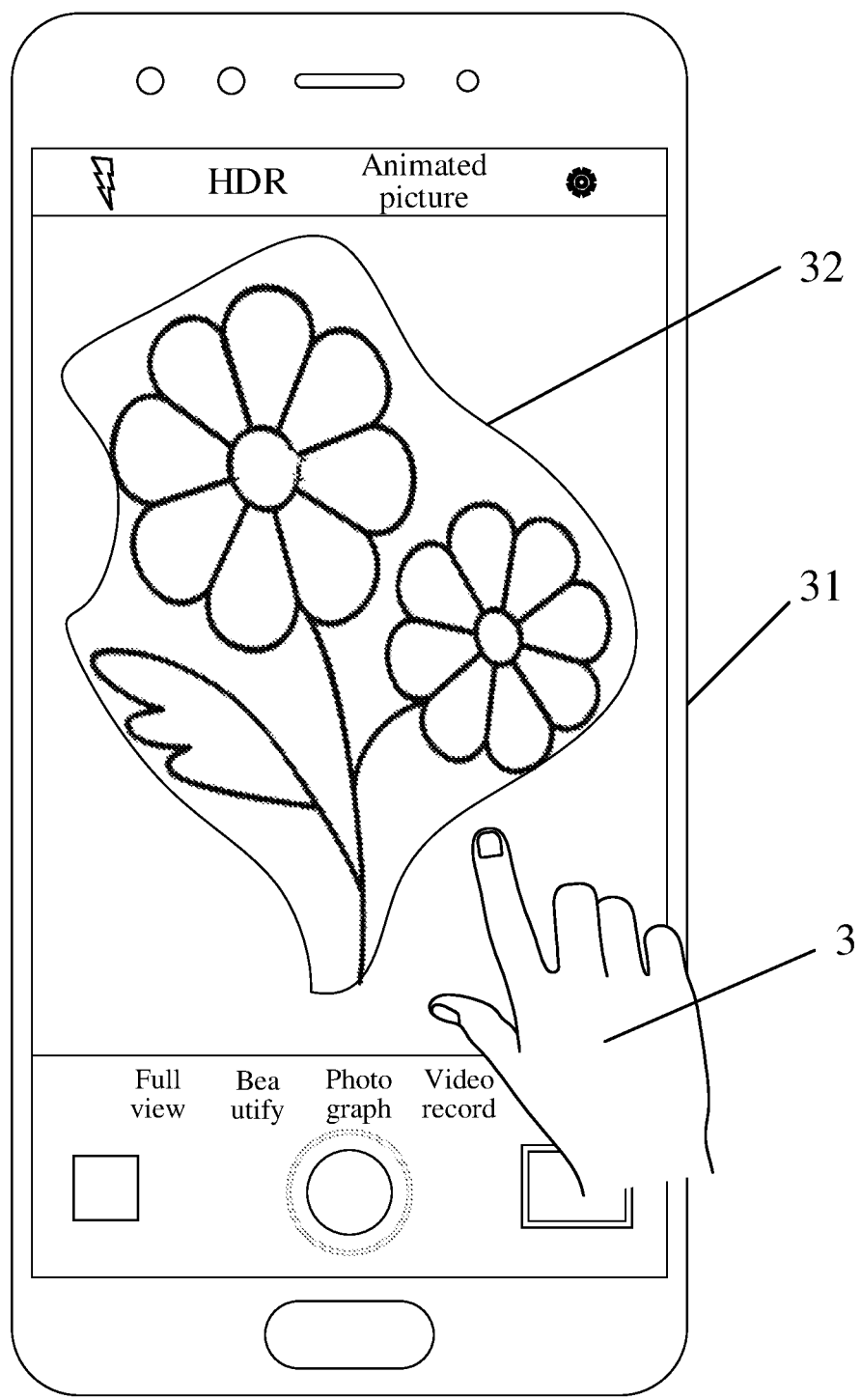
FIG. 3 shows a schematic diagram when the first input is an outline trajectory of an image contour in an embodiment of the present disclosure.

For example, as shown in FIG. 2, when the first preview image is displayed on the first preview interface 21, if a user 2 wants to take a photo based on the first preview image, he/she may input the first input for selecting the target region on the first preview interface 21. The first input may include a rectangular trajectory 22, and the region included in the rectangular trajectory 22 is the target region. For another example, as shown in FIG. 3, when the first preview image is displayed on the first preview interface 31, if a user 3 wants to take a photo based on the first preview image, he/she may input the first input for selecting the target region on the first preview interface 31. The first input may be an outline trajectory 32 of the image contour inputted in the first preview interface, of course, the region included in the outline trajectory 32 is the target region.

Step 102: in response to the first input, superimposing and displaying a second preview interface on the first preview interface, wherein the second preview interface displays a second preview image of the target region.

In this step, specifically, after receiving the first input, in response to the first input, a second preview interface may be superimposed and displayed on the first preview interface, wherein the second preview interface displays the second preview image in the target region. This renders that the image obtained in response to the first input includes the first preview interface displaying the first preview image and the second preview interface displaying the second preview image, which are superimposed. That is, an image obtained in response to the first input has two hierarchies, and it is realized that an image with multiple hierarchies can be obtained during the photographing process, and the second preview image selected by the user from the first preview interface is highlighted.

The first preview interface includes a first-preview-image display region, and the first-preview-image display region displays the first preview image; the second preview interface includes a second-preview-image display region, and the second-preview-image display region displays the second preview image; wherein, the second preview interface includes a pre-stored frame region image, the frame region image includes a frame image of the mobile terminal and an image composed of a control region image in the first preview interface other than the first preview image, and the second preview image is located within a display range of the frame region image. In this way, a display pattern of the second preview interface is similar to a display pattern of the first preview interface, a photographing effect of picture-in-picture is realized, and a hierarchy effect of the photographed image is increased.

Figure 4:
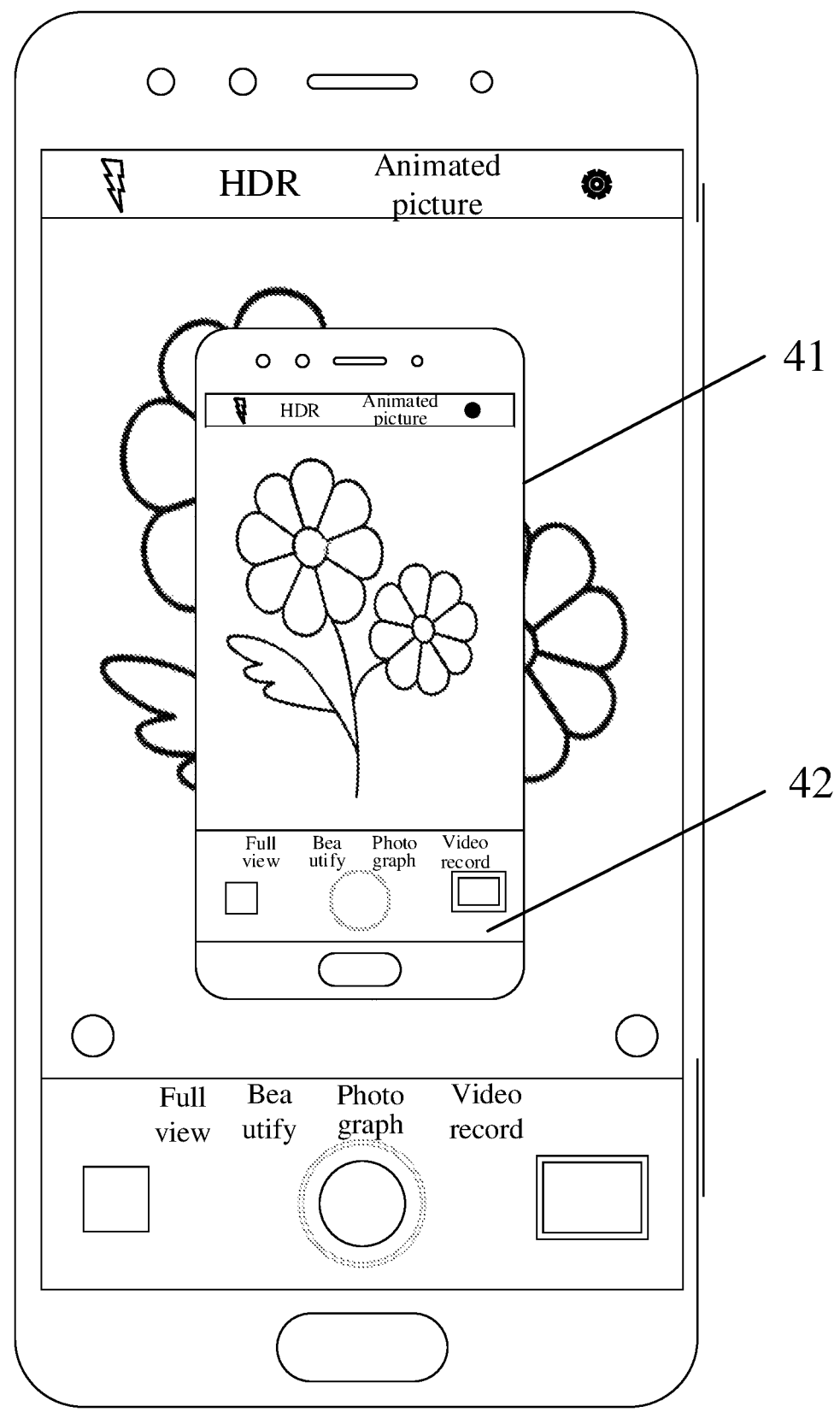
FIG. 4 shows a schematic diagram when a second preview interface is superimposed and displayed on a first preview interface in an embodiment of the present disclosure.

For example, referring to FIG. 4, a second preview interface 41 may be superimposed and displayed on the first preview interface 21 displaying the first preview image in FIG. 2, wherein the second preview interface 41 displays the second preview image 23 in the target region in FIG. 2. The second preview interface 41 includes a frame region image 42, the frame region image 42 may include the frame image of the mobile terminal and the image composed of the control region image in the first preview interface other than the first preview image, and the second preview image 23 in the target region in FIG. 2 is displayed in the display range of the frame region image, which increases similarity between the second preview interface and the first preview interface, realizes the photographing effect of the picture-in-picture, and further increases the hierarchy effect of the displayed image. Of course, when the second preview interface is superimposed and displayed on the first preview interface 31 displaying the first preview image in FIG. 3, the superimposition and the display of the second preview interface in FIG. 3 is same as the superimposition and the display of the second preview interface on the first preview interface 21 in FIG. 2, which is not specifically described herein.

Of course, the first preview interface may also include a control display region, so that the user can input operations on a control on the control display region, so as to realize operating an image during a photographing process.

Step 103: receiving a second input inputted by the user.

In this step, specifically, the second input includes a tap operation on a photography button of the mobile terminal or a long press operation on any position on a display screen of the mobile terminal. Of course, a specific form of the second input is not specifically limited here. In this way, by receiving the second input of the user, the mobile terminal may perform a photographing operation according to the second input.

Step 104: in response to the second input, performing a photographing operation and outputting a target image.

In this step, specifically, when the mobile terminal receives the second input, the mobile terminal may perform a photographing operation in response to the second input, and output the target image. The target image is a composite image generated based on image content displayed on the first preview interface and the second preview interface. This renders the target image obtained through the photographing process to include images displayed on the first preview interface and the second preview interface, so that an image in a picture obtained through the photographing process has two hierarchies, a picture with multiple hierarchies of images can be obtained in the photographing process, and the hierarchy effect of a photo is increased.

The composite image may include a first preview image and a second preview image, and an outer side of the second preview image includes a first frame region image; or, the composite image includes the first preview image and the second preview image, and an outer side of the first preview image includes a second frame region image, and an outer side of the second preview image includes a third frame region image. Specifically, the outer side refers to a surrounding region of a preview image, that is, the surrounding region of the first preview image is the second frame region image; or, the surrounding region of the first preview image is the second frame region image, and the surrounding region of the second preview image is the third frame region image.

In this way, by incorporating the first frame region image on the outer side of the second preview image in the composite image, or by incorporating the second frame region image on the outer side of the first preview image and the third frame region image on the outer side of the second preview image in the composite image, the outer side of the first preview image may either have a frame region image or have no frame region image, so that the user can choose from two photographing effects, which increases selectivity of photographing effects for the user when taking a photo.

In this embodiment, in a state of displaying the first preview image collected by the camera on the first preview interface, the first input, inputted by the user, of selecting the target region on the first preview interface is received, and then in response to the first input, the second preview interface including the second preview image of the target region is superimposed and displayed on the first preview interface, and then the second input of the user is received, and in response to the second input, a photographing operation is performed to output the target image, wherein the target image is the composite image generated based on the image content displayed on the first preview interface and the second preview interface, so that the target image obtained through photography includes the composite image generated by the image contents displayed on the first preview interface and the second preview interface, that is, image contents of two hierarchies of the first preview interface and the second preview interface can be obtained in a photo. An image having multiple hierarchies may be captured during the photographing process.

Further, in this embodiment, the user may select multiple target regions, so that multiple second preview interfaces may be superimposed and displayed on the first preview interface, so that the image obtained through photography can present more image contents and further hierarchy in the image obtained through photography may be increased, diversification and hierarchy of the image obtained through photography may be implemented. Specifically, an implementation process thereof may be as follows:

The number of target regions selected by the first input is N, and N is greater than 1. In such a case, in the step that, in response to the first input, the second preview interface is superimposed and displayed on the first preview interface and the second preview interface displays the second preview image of the target region, N second preview interfaces are superimposed and displayed on the first preview interface and each of the N second preview interfaces displays a preview image of one target region, in response to the first input; wherein the outputted target image is a composite image generated based on image contents displayed on the first preview interface and the N second preview interfaces.

This enables the user to specify multiple different target regions on the first preview interface, so that multiple second preview interfaces can be superimposed on the first preview interface, and each second preview interface displays a preview image in one target region, and it is realized that multiple images selected by the user can be highlighted on the second preview interface of the image obtained through photography.

Figure 5:
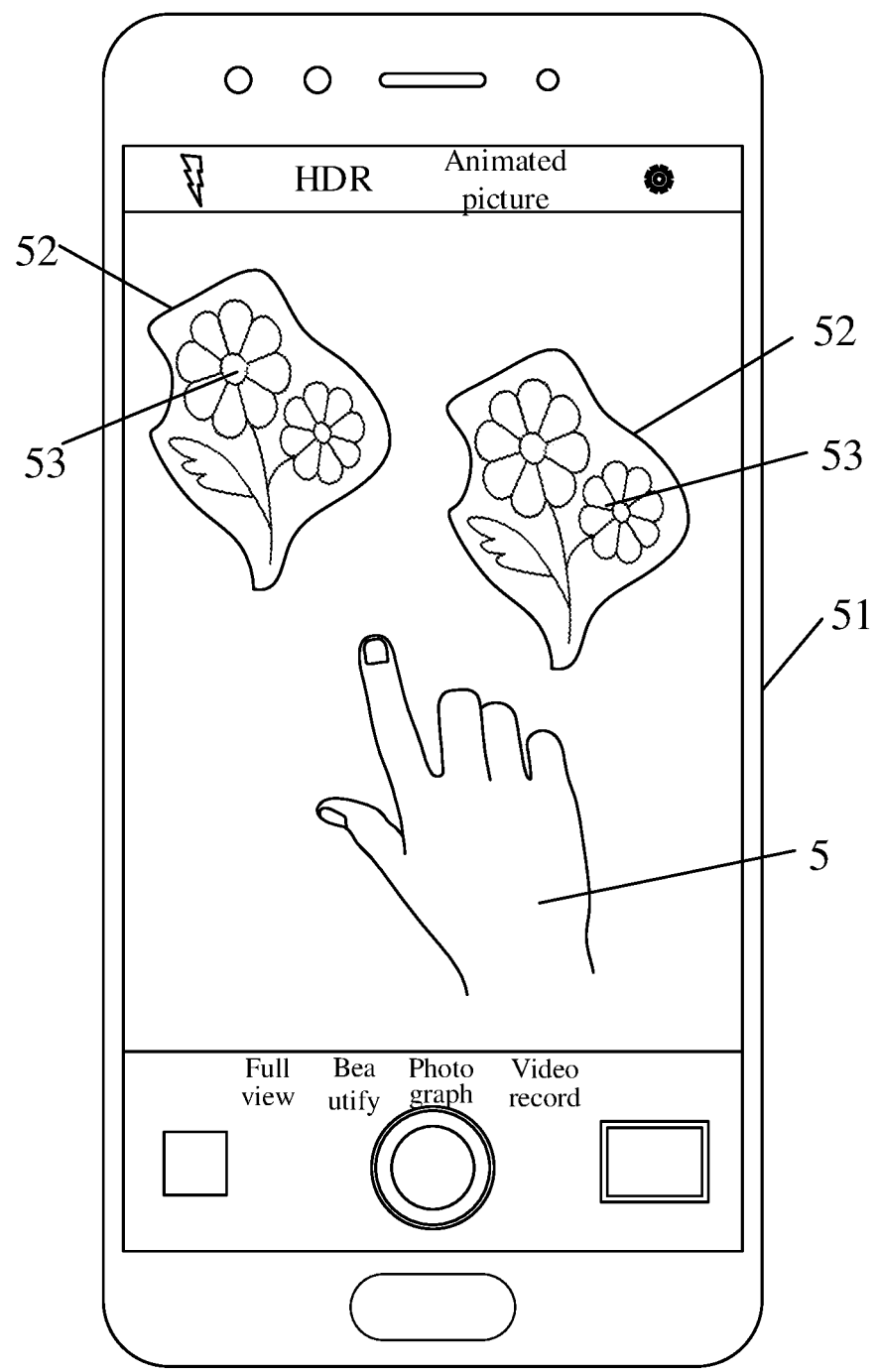
FIG. 5 shows a schematic diagram when the first input is to select multiple target regions in an embodiment of the present disclosure.

For example, as shown in FIG. 5, when the first preview image collected by the camera in real time is displayed on the first preview interface 51, if a user 5 needs to superimpose and display multiple second preview interfaces on the first preview interface 51 based on the first preview image collected in real time, the user 5 may select multiple target regions through the first input, for example, two target regions. Specifically, the first input is outline trajectories of image contours. For example, the user 5 may input two outline trajectories 52 of image contours in the first preview interface 51 shown in FIG. 5, and a range included in an outline trajectory 52 is a target region in this case.

Figure 6:
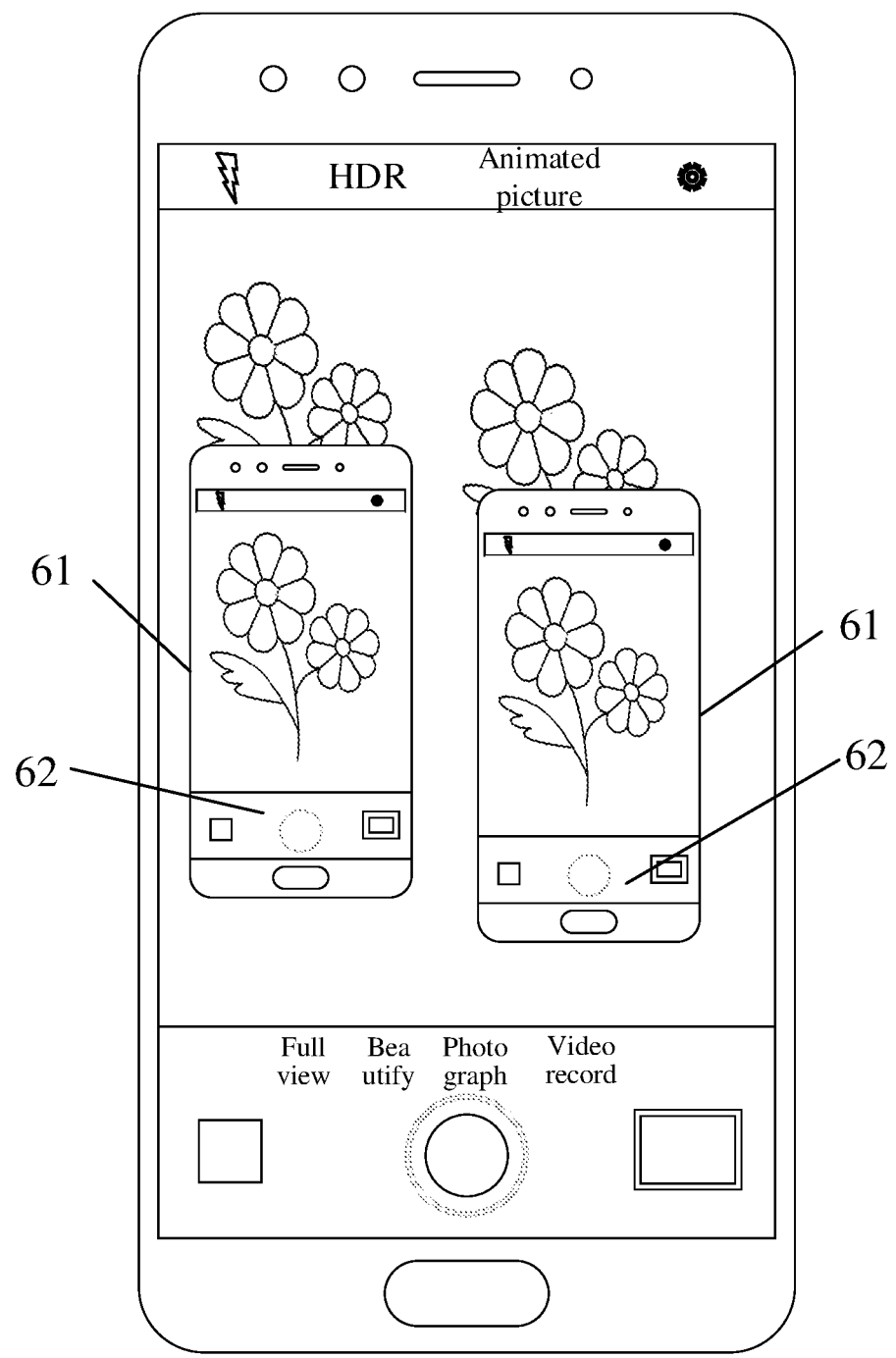
FIG. 6 shows a schematic diagram when N second preview interfaces are superimposed and displayed on the first preview interface in FIG. 5.

In this case, after the mobile terminal receives the first input, referring to FIG. 6, two second preview interfaces 61 may be superimposed and displayed on the first preview interface 51 in FIG. 5, wherein the two second preview interfaces 61 display second preview images 53 in the target regions in FIG. 5 respectively, so that multiple second preview interfaces can be superimposed and displayed on the first preview interface on an image obtained in response to the second input, and each second preview interface displays a second preview image selected by the user. Specifically, each of the two second preview interfaces may include a frame region image 62, wherein the frame region image 62 may include a frame image of the mobile terminal, and the second preview image 53 in the target region in FIG. 5 is displayed in a display range of the frame region image. This increases similarity between the second preview interface and the first preview interface, realizes the effect of picture-in-picture, and further increases the hierarchy effect of the displayed image.

In addition, further, after the second preview interface is superimposed and displayed on the first preview interface in response to the first input, different operations may be performed on the first preview interface and the second preview interface, so that the target image obtained through photography can better meet needs of users. This will be introduced below.

First, if the first input is an operation of a user outlining the outline of a target object in the first preview image, and the target region is a preview image region that includes a preset range of the target object, then after the second preview interface is superimposed and displayed on the first preview interface in response to the first input, at least one of the following may be included: performing a blurring processing on all image regions in the first preview image other than the target region; performing the blur processing on all image regions other than the target object in the second preview image.

In this way, it is possible to obtain a processing effect of blurring only all image regions in the first preview image other than the target region, and a processing effect of blurring only all image regions other than the target object in the second preview image, a processing effect of blurring both all image regions other than the target region in the first preview image and all image regions other than the target object in the second preview image, so that the user can have multiple choices on the blurring processing, and selectivity of a user when performing the blurring processing may be increased.

Specifically, when performing the blur processing on all image regions other than the target region in the first preview image, a first operation can be inputted at any position in all image regions other than the target region in the first preview image. The first operation includes a long-press operation or a double-click operation, so that the mobile terminal performs the blurring processing on all image regions other than the target region. In addition, when performing the blurring processing on all image regions other than the target object in the second preview image, a second operation may be inputted in all image regions other than the target image in the second preview image, and the second operation may be a long-press operation or a double-click operation, so that the mobile terminal performs the blurring processing on all image regions other than the target object.

Second, after the second preview interface is superimposed and displayed on the first preview interface in response to the first input, a third input inputted by the user in a preset operation control region may also be received; in response to the third input, according to an operation direction of the third input, the second preview interface is moved; wherein, during the movement of the second preview interface, the second preview interface displays in real time a preview image of a corresponding region, corresponding to the preview image display region of the second preview interface, in the first preview image.

In this way, the user can move the second preview interface by inputting the third input. In such a case, the second preview interface displays the preview image of the corresponding region in the first preview image corresponding to the preview image display region of the second preview interface in real time. Updating in real time the image displayed in the second preview interface is implemented, which facilitates the user to determine the image displayed in the second preview interface.

Specifically, when the second preview interface is moved according to the operation direction of the third input, a movement direction of the second preview interface may be consistent with the operation direction of the third input, thereby providing convenience for the operation of the user. For example, when the operation direction of the third input is a first direction, the movement direction of the second preview interface is the first direction; when the operation direction of the third input is a second direction, the movement direction of the second preview interface is the second direction so that through the operation direction of the third input, image content on the first preview interface can be displayed in the same direction in real time on the second preview interface, thereby facilitating the operation of the user.

Third, after the second preview interface is superimposed and displayed on the first preview interface in response to the first input, a fourth input of the user in the preset operation control region may also be received; in response to the fourth input, the second preview interface is zoomed; wherein, during the zoom process of the second preview interface, the second preview interface displays in real time a preview image of a corresponding region, corresponding to the preview image display region of the second preview interface, in the first preview image.

In this way, the user can adjust a size of the second preview interface by inputting the fourth input. In such a case, the second preview interface displays the preview image of the corresponding region, corresponding to the adjusted preview image display region of the second preview interface, in the first preview image in real time. It is realized that the image displayed in the second preview interface is updated in real time, which facilitates the user to determine the image displayed in the second preview interface.

Specifically, the fourth input may be a zoom control operation, and the zoom control operation may include an expansion operation and a contraction operation made by at least two fingers of the user on the mobile terminal. When the zoom control operation is the expansion operation made by at least two fingers of the user on the mobile terminal, the second preview interface is enlarged; when the zoom control operation is the contraction operation made by at least two fingers of the user on the mobile terminal, the second preview interface is reduced. This enables zoom of the second preview interface to be consistent with the zoom control operation inputted by the user, so that the user can determine the fourth input according to the required size of the second preview interface, which facilitates the operation of the user.

Fourth, after the second preview interface is superimposed and displayed on the first preview interface in response to the first input, the method further includes at least one of following: in case of receiving a fifth input of the user, adjusting an image parameter of the first preview image in response to the fifth input; in case of receiving a sixth input of the user, adjusting an image parameter of the second preview image in response to the sixth input; in case of receiving a seventh input of the user, adjusting image parameters of the first preview image and the second preview image in response to the seventh input, wherein the seventh input is used to adjust the same image parameter of the first preview image and the second preview image. Specifically, the fifth input includes a click operation on a first preset control on the first preview interface, the sixth input includes a click operation on a second preset control on the first preview interface, and the seventh input includes a click operation on a third preset control on the first preview interface. In addition, specifically, the image parameters may include a filter, an image beautification level, and image color saturation, etc. The specific content of the image parameters is not specifically limited herein.

In this way, the user can individually adjust the image parameters of the first preview image or the second preview image by inputting different input operations, and can also adjust the image parameters of the first preview image and the second preview image at the same time, so that the user is provided with a variety of choices for adjusting the image parameters of a target image, and selectivity of the user when adjusting the image parameters is increased, and the operation is convenient.

In this embodiment, in a state of displaying the first preview image collected by the camera on the first preview interface, the first input, inputted by the user, of selecting the target region on the first preview interface is received, and then in response to the first input, the second preview interface including the second preview image of the target region is superimposed and displayed on the first preview interface, and then the second input of the user is received, and in response to the second input, a photographing operation is performed to output the target image, wherein the target image is the composite image generated based on the image content displayed on the first preview interface and the second preview interface, so that the target image obtained through photography includes the composite image generated by the image contents displayed on the first preview interface and the second preview interface, that is, image contents of two hierarchies of the first preview interface and the second preview interface can be obtained in a photo. An image having multiple hierarchies may be captured during the photographing process.

Figure 7:
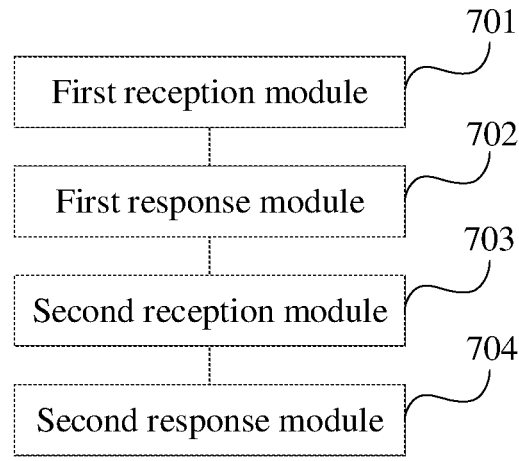
FIG. 7 shows a block diagram of modules of a mobile terminal in an embodiment of the present disclosure.

As shown in FIG. 7, FIG. 7 is a block diagram of modules of a mobile terminal in an embodiment of the present disclosure. The mobile terminal includes: a first reception module 701, a first response module 702, a second reception module 703, and a second response module 704.

The first reception module 701 is used for: in a state where a first preview interface displays a first preview image collected by a camera, receiving a first input of selecting a target region on the first preview interface, the first input being inputted by a user.

The first response module 702 is used for: in response to the first input, superimposing and displaying a second preview interface on the first preview interface, wherein the second preview interface displays a second preview image of the target region.

The second reception module 703 is used for: receive a second input inputted by the user.

The second response module 704 is used for: in response to the second input, performing a photographing operation and outputting a target image, wherein the target image is a composite image generated based on image contents displayed on the first preview interface and the second preview interface.

In the mobile terminal provided in this embodiment, in a state of displaying the first preview image collected by the camera on the first preview interface, the first reception module receives the first input, inputted by the user, of selecting the target region on the first preview interface; the first response module, in response to the first input, superimposes and displays, on the first preview interface, the second preview interface displaying the second preview image of the target region; the second reception module receives the second input of the user; the second response module, in response to the second input, performs a photographing operation to output the target image, wherein the target image is the composite image generated based on the image contents displayed on the first preview interface and the second preview interface, so that the target image obtained through photography includes the composite image generated by the image contents displayed on the first preview interface and the second preview interface, that is, image contents of two hierarchies of the first preview interface and the second preview interface can be obtained in a photo. An image having multiple hierarchies may be captured during the photographing process.

Optionally, the first preview interface includes a first-preview-image display region, and the first preview image is displayed in the first-preview-image display region; the second preview interface includes a second-preview-image display region, and the second-preview-image display region displays the second preview image.

The second preview interface includes a pre-stored frame region image, the frame region image includes a frame image of the mobile terminal and an image composed of a control region image in the first preview interface other than the first preview image, and the second preview image is located within a display range of the frame region image.

Optionally, the composite image includes the first preview image and the second preview image, and the outer side of the second preview image includes a first frame region image; or, the composite image includes the first preview image and the second preview image, and the outer side of the first preview image includes a second frame region image, and the outer side of the second preview image includes a third frame region image.

Optionally, the first input is an operation of a user outlining the outline of a target object in the first preview image, and the target region is a preview image region that includes a preset range of the target object; the mobile terminal includes further at least one of the following: a first blurring processing module, used for performing a blurring processing on all image regions in the first preview image other than the target region; a second blurring processing module, used for performing the blur processing on all image regions other than the target object in the second preview image.

Optionally, the number of target regions selected by the first input is N, and N is greater than 1. The first response module is used for: superimposing and displaying N second preview interfaces on the first preview interface in response to the first input, and each of the N second preview interfaces displays a preview image of one target region; wherein the outputted target image is a composite image generated based on image contents displayed on the first preview interface and the N second preview interfaces.

Optionally, the mobile terminal further includes a third reception module and a third response module.

The third reception module is used for receiving a third input inputted by the user in a preset operation control region. The third response module is used for: in response to the third input, moving the second preview interface according to an operation direction of the third input, wherein, during the movement of the second preview interface, the second preview interface displays in real time a preview image of a corresponding region, corresponding to the preview image display region of the second preview interface, in the first preview image.

Optionally, the mobile terminal further includes a fourth reception module and a fourth response module.

The fourth reception module is used for receiving a fourth input of the user in the preset operation control region. The fourth response module is used for: in response to the fourth input, zooming the second preview interface; wherein, during the zoom process of the second preview interface, the second preview interface displays in real time a preview image of a corresponding region, corresponding to the preview image display region of the second preview interface, in the first preview image.

Optionally, the mobile terminal further includes at least one of the following: a fifth response module, a sixth response module, and a seventh response module.

The fifth response module is used for: in case of receiving a fifth input of the user, adjusting an image parameter of the first preview image in response to the fifth input. The sixth response module is used for: in case of receiving a sixth input of the user, adjusting an image parameter of the second preview image in response to the sixth input. The seventh response module is used for: in case of receiving a seventh input of the user, adjusting image parameters of the first preview image and the second preview image in response to the seventh input, wherein the seventh input is used to adjust the same image parameter of the first preview image and the second preview image.

In the embodiments of the present disclosure, the mobile terminal, in a state of displaying the first preview image collected by the camera on the first preview interface, receives the first input, inputted by the user, of selecting the target region on the first preview interface, and then in response to the first input, superimposes and displays the second preview interface including the second preview image of the target region on the first preview interface, and then receives the second input of the user, and in response to the second input, performs a photographing operation to output the target image, wherein the target image is the composite image generated based on the image contents displayed on the first preview interface and the second preview interface, so that the target image obtained through photography includes the composite image generated by the image contents displayed on the first preview interface and the second preview interface, that is, image contents of two hierarchies of the first preview interface and the second preview interface can be obtained in a photo. An image having multiple hierarchies may be captured during the photographing process.

Figure 8:
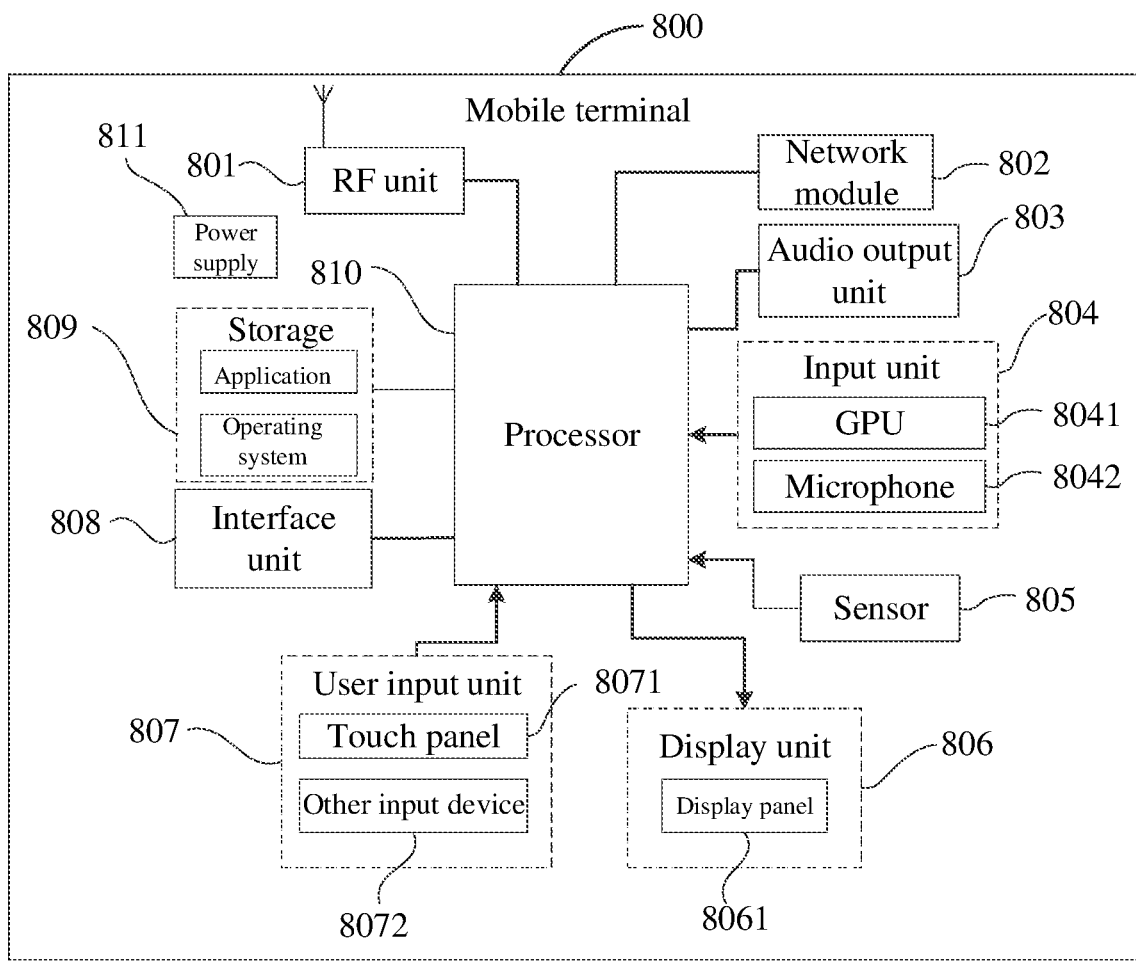
FIG. 8 shows a structural block diagram of a mobile terminal in an embodiment of the present disclosure.

In addition, FIG. 8 is a schematic diagram of a hardware structure of a mobile terminal implementing various embodiments of the present disclosure. The mobile terminal 800 includes, but is not limited to, a radio frequency unit 801, a network module 802, an audio output unit 803, an input unit 804, a sensor 805, a display unit 806, a user input unit 806, an interface unit 808, a storage 809, a processor 810, and a power supply 811 and other components. Those skilled in the art may understand that the structure of the mobile terminal shown in FIG. 8 does not form a limitation of the mobile terminal, the mobile terminal may include more or fewer components than shown in the figure, or some combined components, or different arrangements of components. In some embodiments of the present disclosure, the mobile terminal includes, but is not limited to, a mobile phone, a tablet computer, a notebook computer, a palmtop computer, a vehicle-mounted terminal, a wearable device, a pedometer, and the like.

The processor 810 is used for: in a state where a first preview interface displays a first preview image collected by a camera, receiving a first input of selecting a target region on the first preview interface, the first input being inputted by a user; in response to the first input, superimposing and displaying a second preview interface on the first preview interface, wherein the second preview interface displays a second preview image of the target region; receiving a second input inputted by the user; in response to the second input, performing a photographing operation and outputting a target image, wherein the target image is a composite image generated based on image contents displayed on the first preview interface and the second preview interface The mobile terminal provided in the embodiments of the present disclosure, in a state of displaying the first preview image collected by the camera on the first preview interface, receives the first input, inputted by the user, of selecting the target region on the first preview interface, and then in response to the first input, superimposes and displays the second preview interface including the second preview image of the target region on the first preview interface, and then receives the second input of the user, and in response to the second input, performs a photographing operation to output the target image, wherein the target image is the composite image generated based on the image contents displayed on the first preview interface and the second preview interface, so that the target image obtained through photography includes the composite image generated by the image contents displayed on the first preview interface and the second preview interface, that is, image contents of two hierarchies of the first preview interface and the second preview interface can be obtained in a photo. An image having multiple hierarchies may be captured during the photographing process.

It should be understood that, in the embodiment of the present disclosure, the radio frequency unit 801 may be used for receiving and transmitting signals in processes of transmitting and receiving information or talking. Specifically, after the radio frequency unit 801 receives downlink data from the base station, and the downlink data is transferred by the radio frequency unit 801 to the processor 810 for processing; and additionally the radio frequency unit 801 sends uplink data to the base station. Generally, the radio frequency unit 801 includes, but is not limited to, an antenna, at least one amplifier, a transceiver, a coupler, a low noise amplifier, a duplexer, and the like. In addition, the radio frequency unit 801 may also communicate with a network and other devices through a wireless communication system.

The mobile terminal provides a wireless broadband internet access to a user through the network module 802, such as helping the user to send and receive emails, browse web pages, access streaming media, and the like.

The audio output unit 803 may convert audio data received by the radio frequency unit 801 or the network module 802 or stored in the storage 809 into an audio signal and output the audio signal as sound. The audio output unit 803 may also provide audio output (e.g., a call signal reception sound, a message reception sound, etc.) related to a specific function performed by the mobile terminal 800. The audio output unit 803 includes a speaker, a buzzer, a receiver, and the like.

The input unit 804 is used to receive an audio or video signal. The input unit 804 may include a Graphics Processing Unit (GPU) 8041 and a microphone 8042. The graphics processing unit 8041 processes image data of a still picture or a video obtained by an image capturing device such as a camera in a video capturing mode or an image capturing mode. The processed image frame may be displayed on the display unit 806. Image frames processed by the graphics processing unit 8041 may be stored in the storage 809 (or other storage media) or sent via the radio frequency unit 801 or the network module 802. The microphone 8042 may receive sound and be able to process such sound into audio data. The processed audio data may be converted, in a case of a telephone communication mode, into a format output that may be sent to a mobile communications base station via the radio frequency unit 801.

The mobile terminal 800 also includes at least one sensor 805, such as a light sensor, a motion sensor, and other sensors. In particular, the light sensor includes an ambient light sensor and a proximity sensor, wherein the ambient light sensor may adjust brightness of the display panel 8061 according to brightness of ambient light. The proximity sensor may turn off the display panel 8061 and/or a backlight when the mobile terminal 800 moves close to the ear. As one type of motion sensor, the accelerometer sensor can detect a value of an acceleration in each direction (generally the three axes directions), and can detect a magnitude and a direction of gravity when being stationary, can be used to recognize a posture of a mobile terminal (such as horizontal-vertical screen switching, a related game, a magnetometer posture calibration), a vibration-recognition related function (such as a pedometer, tapping), and the like. The sensor 805 may further include a fingerprint sensor, a pressure sensor, an iris sensor, a molecular sensor, a gyroscope, a barometer, a hygrometer, a thermometer, an infrared sensor, and the like, which will not be described herein.

The display unit 806 is used to display information inputted by the user or information provided to the user. The display unit 806 may include a display panel 8061 that may be configured in the form of a Liquid Crystal Display (LCD), an Organic Light-Emitting Diode (OLED), or the like.

The user input unit 807 may be used to receive inputted digital or character information and generate a key signal input related to user-setting and function control of the mobile terminal. Specifically, the user input unit 807 includes a touch panel 8071 and other input devices 8072. The touch panel 8071, also referred to as a touch screen, may collect a touch operation (e.g., an operation of a user using any suitable object or accessory, such as a finger, stylus, or the like, on or near the touch panel 8071) of the user on or near the touch panel 8071. The touch panel 8071 may include two parts, i.e., a touch detection device and a touch controller. The touch detection device detects a touch orientation of the user, detects a signal brought about by a touch operation, transmits the signal to the touch controller, and the touch controller receives touch information from the touch detection device, converts the touch information into contact coordinates and sends the contact coordinates to the processor 810, and receives and executes commands from the processor 810. In addition, the touch panel 8071 may be implemented in various types such as a resistance type, a capacitance type, an infrared ray, and a surface acoustic wave. The user input unit 807 may also include other input devices 8072 in addition to the touch panel 8071. Specifically, the other input devices 8072 may include, but are not limited to, a physical keyboard, function keys (such as volume control keys, switch keys, etc.), a trackball, a mouse, and a joystick, which will not be described herein.

Further, the touch panel 8071 may be overlaid on the display panel 8061, and after the touch panel 8071 detects a touch operation on or near the touch panel 8071, the touch operation is sent by touch panel 8071 to the processor 810 to determine the type of a touch event. The processor 810 then provides a corresponding visual output on the display panel 8061 according to the type of the touch event. Although in FIG. 8, the touch panel 8071 and the display panel 8061 are two separate components for implementing input and output functions of the mobile terminal, the input and output functions of the mobile terminal in some embodiments may be realized by integrating the touch panel 8071 with the display panel 8061, and the present disclosure is not limited thereto.

The interface unit 808 is an interface in which an external device is connected to the mobile terminal 800. For example, the external device may include a wired or wireless headset port, an external power supply (or a battery charger) port, a wired or wireless data port, a memory card port, a port for connecting a device having an identification module, an audio input/output (I/O) port, a video I/O port, a headphone port, and so on. The interface unit 808 may be used to receive input (e.g., data information, power, etc.) from an external device and transmit the received input to one or more elements within the mobile terminal 800 or may be used to transmit data between the mobile terminal 800 and the external device.

The storage 809 may be used to store software programs and various types of data. The storage 809 may mainly include a storage program area and a storage data area, wherein, the storage program area may store an operating system, an application program required by at least one function (such as a sound playing function, an image playing function, etc.), and the like; the storage data area may store data (such as audio data, a phonebook, etc.) created according to a use condition of the mobile phone. In addition, the storage 809 may include a high speed random access memory, and may also include a non-transitory memory, such as at least one disk storage device, a flash memory device, or other volatile solid state storage device.

The processor 810 is a console of the mobile terminal, connects various parts of the entirety of the mobile terminal using various interfaces and lines, and executes various functions and processes data of the mobile terminal by running or executing software programs and/or modules stored in the storage 809, and by calling data stored in the storage 809, thereby integrally monitoring the mobile terminal. The processor 810 may include one or more processing units; optionally, the processor 810 may integrate an application processor and a modem processor, wherein the application processor primarily processes an operating system, a user interface, an application program, etc. The modem processor mainly handles wireless communication. It will be appreciated that the above-described modem processor may also not be integrated into the processor 810.

The mobile terminal 800 may also include a power supply 811 (such as a battery) that supplies power to various components, optionally, the power supply 811 may be logically connected to the processor 810 via a power management system. Thus, functions such as charging, discharging, and power consumption management are managed by the power management system.

In addition, the mobile terminal 800 includes some functional modules not shown, which will not be described here.

Optionally, an embodiment of the present disclosure further provides a mobile terminal. The mobile terminal includes a processor 810, a storage 809, a computer program stored in the storage 809 and executable by the processor 810, wherein when the computer program is executed by the processor 810, each process of the foregoing embodiments of the photographing method is realized, and the same technical effect can be achieved. In order to avoid repetition, details thereof are not repeated here.

The embodiments of the present disclosure also provide a computer readable storage medium, and a computer program is stored on the computer readable storage medium. When the computer program is executed by a processor, each process of the above embodiments of the photographing method is realized, and the same technical effect can be achieved. To avoid repetition, description thereof is not repeated here. The computer readable storage medium is such as a read-only memory (Read-Only Memory, ROM), a random access memory (Random Access Memory, RAM), a magnetic disk, or an optical disk, etc.

It should be noted that such terms as "including", "comprising" or any other variation thereof herein are intended to encompass non-exclusive inclusions such that a process, method, article or device including a series of elements includes not only those elements, but also other elements that are not explicitly listed, or elements inherent to such a process, method, article or user equipment. An element after a statement "including" does not exclude presence of further identical elements in the process, method, article or device that includes the element, if without further limitation.

Through description of the above embodiments, those skilled in the art can clearly understand that the method of the above embodiments can be implemented by means of software plus a necessary general hardware platform, but of course, can also be implemented by hardware, but in many cases the former is better implementation. Based on this understanding, the essential part of the technical solutions of the present disclosure or a part that contributes to the related art can be embodied in the form of a software product. The computer software product is stored in a storage medium (such as a ROM/RAM, a magnetic disk, an optical disk) and includes several instructions to make a terminal (which can be a mobile phone, a computer, a server, an air-conditioner, or a network device, etc.) execute the methods described in the various embodiments of the present disclosure.

The embodiments of the present disclosure are described above with reference to the accompanying drawings, but the present disclosure is not limited to the above-mentioned specific embodiments. The above-mentioned specific embodiments are only illustrative and not restrictive. Those of ordinary skill in the art, under enlightenment of the present disclosure, may make many forms without departing from the principle of the present disclosure and the protection scope of the claims, all of which fall within the protection scope of the present disclosure.

What is claimed is:

1. A photographing method, comprising:
in a state where a first preview interface displays a first preview image collected by a camera, receiving a first input of selecting a target region on the first preview interface, the first input being inputted by a user;
in response to the first input, superimposing and displaying a second preview interface on the first preview interface, the second preview interface displaying a second preview image of the target region;
receiving a second input inputted by the user;
in response to the second input, performing a photographing operation and outputting a target image, wherein the target image is a composite image generated based on image contents displayed on the first preview interface and the second preview interface.

2. The method according to claim 1, wherein,
the first preview interface comprises a first-preview-image display region, and the first-preview-image display region displays the first preview image;
the second preview interface comprises a second-preview-image display region, and the second-preview-image display region displays the second preview image;
the second preview interface comprises a pre-stored frame region image, the frame region image comprises a frame image of the mobile terminal and an image composed of a control region image in the first preview interface other than the first preview image, and the second preview image is located within a display range of the frame region image.

3. The method according to claim 1, wherein,
the composite image comprises the first preview image and the second preview image, and an outer side of the second preview image comprises a first frame region image; or,
the composite image comprises the first preview image and the second preview image, and an outer side of the first preview image comprises a second frame region image, and an outer side of the second preview image comprises a third frame region image.

4. The method according to claim 1, wherein the first input is an operation of a user outlining an outline of the target object in the first preview image, and the target region is a preview image region that comprises a preset range of the target object;
after in response to the first input, superimposing and displaying the second preview interface on the first preview interface, the method comprises further at least one of the following:
performing a blurring processing on all image regions other than the target region in the first preview image;
performing the blur processing on all image regions other than the target object in the second preview image.

5. The method according to claim 1, wherein the number of target regions selected by the first input is N, and N is greater than 1;
in response to the first input, superimposing and displaying the second preview interface on the first preview interface, the second preview interface displaying the second preview image of the target region, comprises:
superimposing and displaying N second preview interfaces on the first preview interface in response to the first input, each of the N second preview interfaces displaying a preview image of one target region;
wherein the outputted target image is a composite image generated based on image contents displayed on the first preview interface and the N second preview interfaces.

6. The method according to claim 1, wherein after in response to the first input, superimposing and displaying the second preview interface on the first preview interface, the method further comprises:
receiving a third input inputted by the user in a preset operation control region;
in response to the third input, according to an operation direction of the third input, moving the second preview interface is moved;
wherein, during movement of the second preview interface, the second preview interface displays in real time a preview image of a corresponding region, corresponding to a preview image display region of the second preview interface, in the first preview image.

7. The method according to claim 1, wherein after in response to the first input, superimposing and displaying the second preview interface on the first preview interface, the method further comprises:
receiving a fourth input of the user in a preset operation control region;
in response to the fourth input, zooming the second preview interface;
wherein, during a zoom process of the second preview interface, the second preview interface displays in real time a preview image of a corresponding region, corresponding to a preview image display region of the second preview interface, in the first preview image.

8. The method according to claim 1, wherein after in response to the first input, superimposing and displaying the second preview interface on the first preview interface, the method further comprises at least one of following:
in case of receiving a fifth input of the user, adjusting an image parameter of the first preview image in response to the fifth input;
in case of receiving a sixth input of the user, adjusting an image parameter of the second preview image in response to the sixth input;
in case of receiving a seventh input of the user, adjusting image parameters of the first preview image and the second preview image in response to the seventh input, wherein the seventh input is used to adjust a same image parameter of the first preview image and the second preview image.

9. A mobile terminal, comprising:
a storage, a processor, and a computer program stored on the storage and executable by the processor, wherein when the computer program is executed by the processor, the processor implements a photographing method, the method comprises:
in a state where a first preview interface displays a first preview image collected by a camera, receiving a first input of selecting a target region on the first preview interface, the first input being inputted by a user;
in response to the first input, superimposing and displaying a second preview interface on the first preview interface, the second preview interface displaying a second preview image of the target region;
receiving a second input inputted by the user;
in response to the second input, performing a photographing operation and outputting a target image, wherein the target image is a composite image generated based on image contents displayed on the first preview interface and the second preview interface.

10. The mobile terminal according to claim 9, wherein, the first preview interface comprises a first-preview-image display region, and the first-preview-image display region displays the first preview image;
the second preview interface comprises a second-preview-image display region, and the second-preview-image display region displays the second preview image;
the second preview interface comprises a pre-stored frame region image, the frame region image comprises a frame image of the mobile terminal and an image composed of a control region image in the first preview interface other than the first preview image, and the second preview image is located within a display range of the frame region image.

11. The mobile terminal according to claim 9, wherein, the composite image comprises the first preview image and the second preview image, and an outer side of the second preview image comprises a first frame region image; or,
the composite image comprises the first preview image and the second preview image, and an outer side of the first preview image comprises a second frame region image, and an outer side of the second preview image comprises a third frame region image.

12. The mobile terminal according to claim 9, wherein the first input is an operation of a user outlining an outline of the target object in the first preview image, and the target region is a preview image region that comprises a preset range of the target object;
after in response to the first input, superimposing and displaying the second preview interface on the first preview interface, when the computer program is executed by the processor, the processor implements further at least one of the following:
performing a blurring processing on all image regions other than the target region in the first preview image;
performing the blur processing on all image regions other than the target object in the second preview image.

13. The mobile terminal according to claim 9, wherein the number of target regions selected by the first input is N, and N is greater than 1;
in response to the first input, superimposing and displaying the second preview interface on the first preview interface, the second preview interface displaying the second preview image of the target region, comprises:
superimposing and displaying N second preview interfaces on the first preview interface in response to the first input, each of the N second preview interfaces displaying a preview image of one target region;
wherein the outputted target image is a composite image generated based on image contents displayed on the first preview interface and the N second preview interfaces.

14. The mobile terminal according to claim 9, wherein after in response to the first input, superimposing and displaying the second preview interface on the first preview interface, when the computer program is executed by the processor, the processor further implements:
receiving a third input inputted by the user in a preset operation control region;
in response to the third input, according to an operation direction of the third input, moving the second preview interface is moved;
wherein, during movement of the second preview interface, the second preview interface displays in real time a preview image of a corresponding region, corresponding to a preview image display region of the second preview interface, in the first preview image.

15. The mobile terminal according to claim 9, wherein after in response to the first input, superimposing and displaying the second preview interface on the first preview interface, when the computer program is executed by the processor, the processor further implements:
receiving a fourth input of the user in a preset operation control region;
in response to the fourth input, zooming the second preview interface;
wherein, during a zoom process of the second preview interface, the second preview interface displays in real time a preview image of a corresponding region, corresponding to a preview image display region of the second preview interface, in the first preview image.

16. The mobile terminal according to claim 9, wherein after in response to the first input, superimposing and displaying the second preview interface on the first preview interface, when the computer program is executed by the processor, the processor further implements at least one of following:
in case of receiving a fifth input of the user, adjusting an image parameter of the first preview image in response to the fifth input;
in case of receiving a sixth input of the user, adjusting an image parameter of the second preview image in response to the sixth input;
in case of receiving a seventh input of the user, adjusting image parameters of the first preview image and the second preview image in response to the seventh input, wherein the seventh input is used to adjust a same image parameter of the first preview image and the second preview image.

17. A non-transitory computer readable storage medium storing a computer program, which, when the computer program is executed by a processor, the processor implements a photographing method, the method comprises:
in a state where a first preview interface displays a first preview image collected by a camera, receiving a first input of selecting a target region on the first preview interface, the first input being inputted by a user;
in response to the first input, superimposing and displaying a second preview interface on the first preview interface, the second preview interface displaying a second preview image of the target region;

receiving a second input inputted by the user;

in response to the second input, performing a photographing operation and outputting a target image, wherein the target image is a composite image generated based on image contents displayed on the first preview interface and the second preview interface.

18. The non-transitory computer readable storage medium according to claim 17, wherein the first preview interface comprises a first-preview-image display region, and the first-preview-image display region displays the first preview image;

the second preview interface comprises a second-preview-image display region, and the second-preview-image display region displays the second preview image;

the second preview interface comprises a pre-stored frame region image, the frame region image comprises a frame image of the mobile terminal and an image composed of a control region image in the first preview interface other than the first preview image, and the second preview image is located within a display range of the frame region image.

19. The non-transitory computer readable storage medium according to claim 17, wherein, the composite image comprises the first preview image and the second preview image, and an outer side of the second preview image comprises a first frame region image; or, the composite image comprises the first preview image and the second preview image, and an outer side of the first preview image comprises a second frame region image, and an outer side of the second preview image comprises a third frame region image.

20. The non-transitory computer readable storage medium according to claim 17, wherein, the first input is an operation of a user outlining an outline of the target object in the first preview image, and the target region is a preview image region that comprises a preset range of the target object;

after in response to the first input, superimposing and displaying the second preview interface on the first preview interface, the computer program is executed by the processor, the processor further implements at least one of the following:

performing a blurring processing on all image regions other than the target region in the first preview image;

performing the blur processing on all image regions other than the target object in the second preview image.

* * * * *